E. M. FISCHER.
DEVICE FOR ARRANGING ARTICLES IN ROWS.
APPLICATION FILED AUG. 25, 1916.

1,240,834.

Patented Sept. 25, 1917.

Inventor:
Ernst Max Fischer
By
Carl P. Goepel
attorney

E. M. FISCHER.
DEVICE FOR ARRANGING ARTICLES IN ROWS.
APPLICATION FILED AUG. 25, 1916.

1,240,834.

Patented Sept. 25, 1917.
2 SHEETS—SHEET 2.

Inventor:
Ernst Max Fischer
By
Carl P. Goepel
Attorney.

UNITED STATES PATENT OFFICE.

ERNST MAX FISCHER, OF DÖLZSCHEN, NEAR DRESDEN, GERMANY.

DEVICE FOR ARRANGING ARTICLES IN ROWS.

1,240,834.  Specification of Letters Patent.  Patented Sept. 25, 1917.

Application filed August 25, 1916. Serial No. 116,806.

*To all whom it may concern:*

Be it known that I, ERNST MAX FISCHER, a subject of the Emperor of Germany, and resident of Dölzschen, near Dresden, Germany, have invented certain new and useful Improvements in Devices for Arranging Articles in Rows, of which the following is a statement.

An arrangement for mechanically re-arranging solids, supplied in single file into several rows running beside each other, is already known. The arrangement forming the subject matter of the present invention, which is mainly intended for re-arranging and feeding chocolate molds, differs from the said known arrangement by the manner in which the said re-arranging is performed. A wide race formed by stationarily journaled, continuously revolving rollers receives the molds supplied in single file, in order to feed them on in several parallel rows. The molds are distributed to the several rows or over the width of the race by means of feeders which are disposed between the rollers of the first group, and which move both up and down and to and fro, in a way resembling the foot of a sewing machine. Until a transverse line has been completed the molds are, notwithstanding the continuous rotation of the rollers retained by a gatelike controlled stop, which is removed when the transverse row has been completed, whereupon the feeding action of the revolving rollers becomes effective. The feeders referred to are already known, but their disposal between the rollers and their coöperating with the said rollers and the stop for temporarily retaining the molds is a novel feature. The improvement residing in the coöperation of the feeders with the rollers consists in the said rollers which continuously revolve but are rendered ineffective as feed rollers by the said stop and replace with regard to the feeders the known stationary grate through the slots of which the feeders project, and from which the molds are lifted by the feeders, and onto which they are again replaced after their re-arrangement has been performed.

Figure 1:
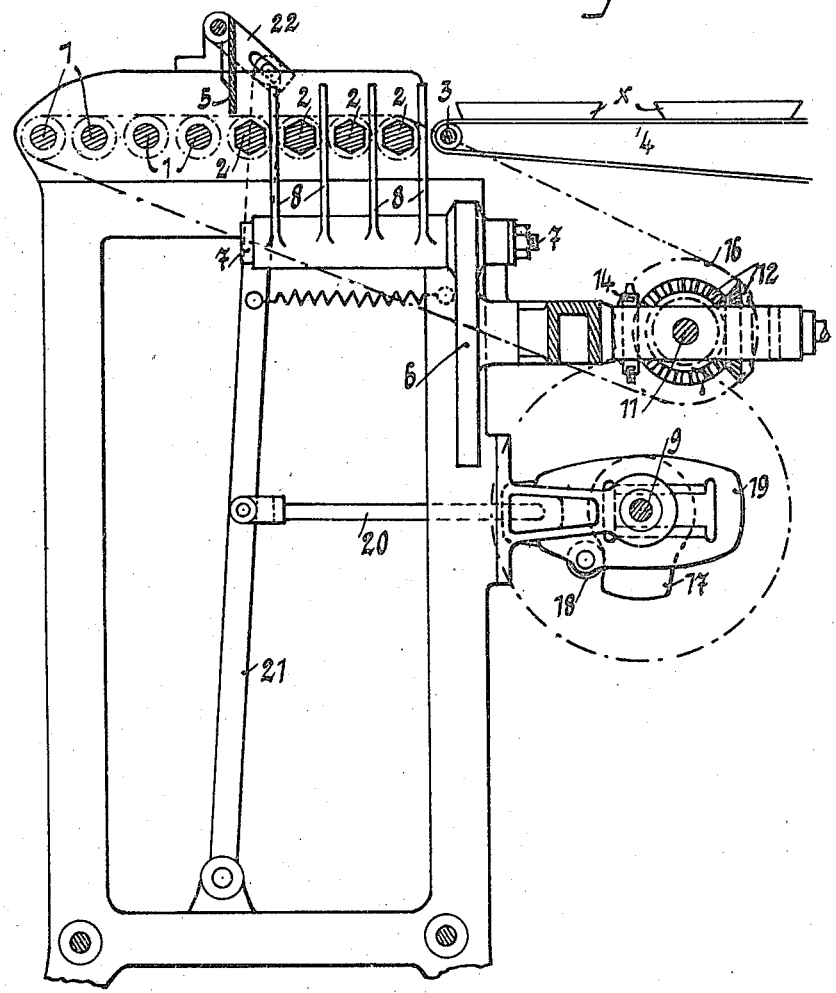
Figure 2:
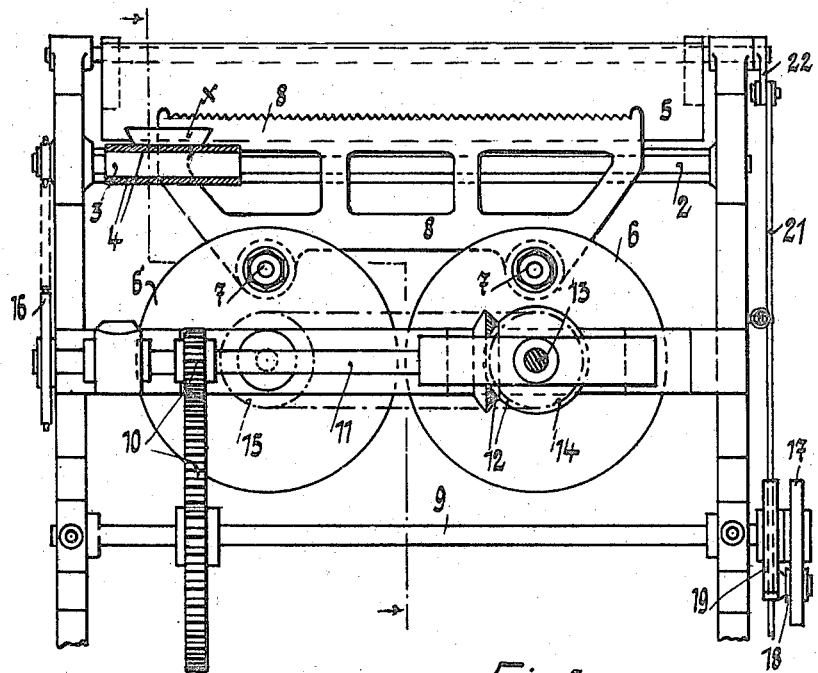
Figure 3:
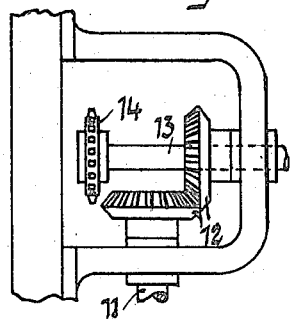

In the accompanying drawing a feed arrangement of the kind described has been exemplified. Figure 1 is an elevation showing a vertical longitudinal section through the wide feed race. Fig. 2 is a side elevation seen from the feed end. Fig. 3 is a plan view of a part of the gearing.

Stationarily journaled, continuously revolving rollers which in group 1, 1 are round, in group 2, 2 polygonal, form a wide roller race which leads, for example, to the knocking table. In front of this wide roller race is disposed close before the entrance end a roller 3 (Fig. 2, left) and over this roller 3 runs a narrow feed strap 4 which brings the molds from the mold filling machine or the like. This feed thus delivers the molds $x$ in single file to the rollers 2 at the one side of the wide race.

The mold $x$ delivered to the rollers 2 is retained by a stop, the hinged gate 5, extending across the whole width of the race, although the rollers 2 revolve continuously.

Two crank disks 6 disposed transversely to the roller race and in the same plane carry by means of crank pins 7 (thus forming a crank parallelogram) the links 8 disposed between the rollers 2. The links 8 therefore will rise and fall between the rollers 2, and reciprocatingly move to (to the right as seen in Fig. 2) above the rollers, and fro below the rollers. The links 8 may be compared with the feed dog of a sewing machine and shall hereinafter be called feeders. They lift the mold $x$ delivered to the rollers 2, off the said rollers, take it a certain distance to the right and then set it down again on the rollers. The feed stroke is such that it corresponds to the interval between adjacent molds in each of the parallel rows of molds to be arranged on the roller race. If, therefore, the first mold delivered is, at the first stroke of the feeder moved aside by one space, it will, at the second stroke of the feeder be again moved aside by one space, and so on, until it has reached the opposite side of the race at the entrance end (Fig. 2, right). In the meantime other molds have been delivered at the entrance end onto the rollers 2 which are also shifted aside by the following strokes of the feeder, so that, eventually including the last mold delivered but not yet seized by the feeder the whole width of the race will be filled with molds. As soon as this is the case, and before the feeder rises again the stop 5 is lifted. Immediately the feeding effect of the revolving rollers 2 comes into action and the row of molds, clear of the stop begins to travel over the rollers 1. In the meantime a fresh row of molds is assembled on the rollers 2.

The driving gear is composed as follows: The main driving and controlling shaft 9 drives by means of the pair of gears 10 the intermediate shaft 11. This shaft 11 drives by means of the pair of bevel gears 12 the shaft 13 disposed transversely thereto. To the said shaft 13 is fitted the one crank disk 6 (Fig. 2, right) and the sprocket 14, from which a second transverse shaft 15 with the second crank disk 6 is driven. A sprocket 16 on shaft 11 drives the rollers 1 and 2 as will be evident from Figs. 1 and 2.

To the driving shaft 9 is fitted a lifting cam 17, which acts against a roller 18 on the head 19 of bar 20, said head being made as a slider. By means of this rod 20 and the levers 21 and 22 the gate 5 is rocked in the direction indicated by the arrow when the proper moment arrives.

The delivery of the single file of molds to the wide race may also be effected in a manner differing from that hereinbefore described and shown in the drawing.

It is obvious that the hereinbefore described arrangement may also be used for re-arranging other articles than chocolate molds.

I claim:

1. In a device for re-arranging articles, supplied in single file, into several parallel rows, a race composed of continuously revolving rollers, means for supplying the articles to said rollers in single file, a liftable stop in front of the delivery point of said articles, feeders between said rollers, means for raising and lowering and simultaneously reciprocating said feeders between said rollers, and means for lifting said stop when a row of articles upon said rollers has been completed.

2. In a device for arranging articles into rows, a race composed of parallel rollers, means for supplying articles to said rollers, a stop normally arranged in the path of said articles, to hold them against being carried forward by said rollers, feeders located between said rollers and arranged to reciprocate lengthwise thereof to transfer the articles longitudinally of the rollers while such articles are arrested by said stop, and means for moving the stop out of the path of the articles to allow them to proceed.

3. In a device for arranging articles in rows, a race composed of parallel rollers, means for supplying articles to said rollers near one end, a stop for temporarily holding said articles against being carried forward by said rollers, a feeder arranged to move lengthwise of said rollers and also movable toward and from the rollers so that during the active stroke the feeder will project to engage the articles resting on the rollers and feed them lengthwise of the rollers, while during the return stroke the feeder will clear said articles and remain inactive, and means for releasing said articles from said stop to allow them to proceed.

4. In a device for arranging articles in rows, a traveling support for the articles, a stop for temporarily holding the articles against being carried forward by said traveling support, a feeder arranged to move transversely of the direction in which said support travels, and to shift the articles thereon in a like transverse direction, and means for releasing the articles from said stop to allow them to proceed.

5. In a device for arranging articles in rows, a traveling support for the articles, means for delivering the articles to said support at one side thereof, a stop for temporarily holding the articles against being carried forward by said traveling support, a feeder arranged to reciprocate transversely of the direction in which said support travels and also movable toward and from said support so that during the active stroke the feeder will project to engage the articles resting on the support and shift them transversely thereof, away from the side at which they are supplied, while during the return stroke the feeder will clear said articles and remain inactive, and means for releasing the articles from said stop and allowing them to proceed.

In testimony, that I claim the foregoing as my invention, I have signed my name in presence of two subscribing witnesses.

ERNST MAX FISCHER.

Witnesses:
RICHARD IFFERTE,
PAUL LIENEMANN.